United States Patent
Cordsmeyer et al.

(10) Patent No.: US 7,139,244 B1
(45) Date of Patent: Nov. 21, 2006

(54) SYSTEM AND METHOD FOR REMOTELY INVENTORYING MULTIPLEXING ELEMENT SWITCHING FABRIC

(75) Inventors: Joel E. Cordsmeyer, Tucker, GA (US); Frederick L. Edwards, Ellen Wood, GA (US); Robert J. Bates, Alpharetta, GA (US)

(73) Assignee: BellSouth IP Corporation, Wlimington, DE (US)

( * ) Notice: Subject to any disclaimer, the term of this patent is extended or adjusted under 35 U.S.C. 154(b) by 890 days.

(21) Appl. No.: 09/961,078

(22) Filed: Sep. 21, 2001

(51) Int. Cl.
*G01R 31/08* (2006.01)

(52) U.S. Cl. .................. 370/250; 370/422; 370/352

(58) Field of Classification Search ........ 370/352–356, 370/371, 374
See application file for complete search history.

(56) References Cited

U.S. PATENT DOCUMENTS

| | | | |
|---|---|---|---|
| 6,363,421 B1* | 3/2002 | Barker et al. ............... | 709/223 |
| 6,697,970 B1* | 2/2004 | Chisholm .................... | 714/48 |
| 2002/0018478 A1* | 2/2002 | Takeyama et al. .......... | 370/401 |
| 2002/0101864 A1* | 8/2002 | Teixeira ...................... | 370/360 |
| 2003/0012142 A1* | 1/2003 | Nagahama .................. | 370/250 |
| 2004/0213189 A1* | 10/2004 | Alspaugh et al. ........... | 370/338 |

* cited by examiner

*Primary Examiner*—Chau Nguyen
*Assistant Examiner*—Christopher Grey
(74) *Attorney, Agent, or Firm*—Lee & Hayes, PLLC

(57) ABSTRACT

Systems and methods for inventorying a broadband access network multiplexing element switch fabric are disclosed. The methods include establishing communication with an element manager from a remote location, gathering status information for the multiplexing element by issuing a first interface retrieve command to the element manager from the remote location, and gathering status information for the switch fabric by issuing a second interface retrieve command to the multiplexing element from the remote location. The systems include an element manager, a first communications path between the element manager and a multiplexing element, the first communications path carrying information and control commands between the element manager and the multiplexing element, an inventory tool at a location remote from the element manager, the inventory tool generating inventory commands and compiling status information received in response to the inventory commands, and a second communications path between the inventory tool and the element manager, the second communications path carrying the inventory commands and status information between the inventory tool and the element manager.

25 Claims, 3 Drawing Sheets

SYSTEM AND METHOD FOR REMOTELY INVENTORYING MULTIPLEXING ELEMENT SWITCHING FABRIC

I. BACKGROUND

A. Field of the Invention

The invention relates generally to the field of telecommunications, and more particularly to systems and methods for managing resources in a broadband access network.

B. Description of the Related Art

Digital Subscriber Line (DSL), a modem technology, converts existing twisted-pair telephone lines into access paths for multimedia and high-speed data communications. XDSL services promise to dramatically increase the speed of copper wire based transmission systems without requiring expensive upgrades to the local loop infrastructure. As used herein, xDSL refers to the numerous variations of DSL technology using the Bellcore acronyms such as ADSL (Asymmetric DSL), HDSL (high bit-rate DSL), RADSL (rate-adaptive DSL), and the like. New and improved versions of xDSL are in constant development and the invention is not intended to be limited to any single variation of the technology.

Most xDSL signals fall within the frequency range of 4 KHz to 2.2 MHz, with the range of 0 to 4 KHz reserved for the transmission of analog voice signals for plain old telephone service (POTS). The theoretical maximum amount of bandwidth between 4 KHz and 2.2 MHz is almost 70 Mbps of digital data spectrum. In practice however, only lab test conditions have ever reached higher than 60 Mbps and currently available products typically use 2 Mbps to 8 Mbps.

The different types of xDSL technologies may also be categorized as either symmetric EC xDSL or asymmetric (FDM) xDSL. A first class of EC xDSL includes Integrated Services Digital Network (ISDN), High-Bit-Rate DSL (HDSL), and Single-Line DSL (SDSL). A second class of EC xDSL includes Asymmetric DSL (ADSL) and Rate Adaptive DSL (RADSL). The modulation technologies employed with the various types of xDSL include 2-binary 1-quaternary (2B1Q) for ISDN and HDSL, carrierless amplitude phase modulation (CAP) for HDSL, SDSL and RADSL, and discrete multi-tone modulation (DMT) for ADSL and RADSL.

DMT essentially breaks up the upstream and downstream bands into smaller individual or discrete bands. The modems on either end listen to these discrete bands as smaller channels within the main upstream or downstream channel. Often, one of these smaller bands will be disrupted by noise, rendering the information carried within that band useless. Rather than toss away all the information sent at that instant across the entire upstream or downstream band, only that small part is lost and needs to be retransmitted. With CAP, the overall amplitude or power of the signal is modulated. The signal is not safeguarded against noise and often suffers from lost information, which accounts in part for the lower transmission speeds of CAP-based DSL technologies. With amplitude modulation, there is also more loss over longer ranges. The benefits of CAP over DMT are that it is simpler in design and therefore cheaper, requires less power, and generates less heat. Both power consumption and heat are serious factors when it comes to housing many of these systems together (as in a central office). DMT however, often provides the best results and maintains the full bandwidth at its maximum range of 18,000 feet. CAP signals degrade quickly after 10,000 feet.

Typical xDSL systems are implemented as follows. At the customer premises a splitter is provided which separates the xDSL signals (i.e., digital data signals) from the POTS analog voice signals. The main purpose of the splitter is to shield ordinary telephones from the high frequency xDSL signals that can have disastrous effects on the telephone or human ear. The data line from the splitter connects to an xDSL modem and the analog line connects to the telephone. With xDSL Lite and some other product models, there is no external splitter or it is combined into the xDSL modem unit. An Ethernet line will usually link the xDSL modem to the customer premises PC.

The twisted pair from the customer premises connects to an xDSL access multiplexer (DSLAM) typically located at the incumbent local exchange carrier (ILEC) central office (CO). The twisted pair from the customer premise may also pass through a neighborhood wiring distribution frame, which is a central point where the wire pairs from several customer premises come together, and/or an ILEC remote terminal before reaching the CO. A DSLAM is a multimodule unit that houses many CO-side xDSL modems within a single shelf much like the analog modem racks of today. At the DSLAM the voice and data lines are split out along separate paths. The digital data signal goes into either an ATM concentrator or an Internet Protocol router. The analog voice signals are connected to the CO phone switch. Thus, the digital data packets go through the router out to the Internet, and the analog voice signals go through the phone switch and into the public switched telephone network.

ADSL is one particularly promising and popular form of xDSL. ADSL can transmit up to 6 Mbps to a subscriber, and as much as 832 kbps or more in both the downstream and upstream directions. Such rates expand existing access capacity by a factor of 50 or more without the need to install new wiring or cabling. An ADSL circuit connects an ADSL modem on each end of a twisted-pair telephone line, creating three information channels—a high speed downstream channel, a medium speed duplex channel, depending on the implementation of the ADSL architecture, and a POTS or ISDN channel. The POTS/ISDN channel is split off from the digital modem by filters, thus guaranteeing uninterrupted POTS/ISDN, even if ADSL fails. The high speed channel ranges from 1.5 to 6.1 Mbps, while duplex rates range from 16 to 832 kbps. Each channel can be submultiplexed to form multiple, lower rate channels, depending on the system.

ADSL modems provide data rates consistent with North American and European digital hierarchies and can be purchased with various speed ranges and capabilities. The minimum configuration provides 1.5 or 2.0 Mbps downstream and a 16 kbps duplex channel; others provide rates of 6.1 Mbps and 64 kbps duplex. Products with downstream rates up to 8 Mbps and duplex rates up to 640 kbps are available today. ADSL modems also can accommodate ATM transport with variable rates and compensation for ATM overhead, as well as IP protocols. Downstream data rates depend on a number of factors, including the length of the copper line, its wire gauge, presence of bridged taps, and cross-coupled interference. Line attenuation increases with line length and frequency, and decreases as wire diameter increases.

FIG. 1 shows an ADSL based broadband access architecture 100 currently employed by the assignee of the present invention. In order for an IP enabled device (e.g., personal computer 103 in home 102a) to establish a service session with a source on the Internet 115, the IP enabled device first establishes an access session with an Open Systems Interconnection (OSI) model layer 2/3 communications element (e.g., router 114) in an Internet service provider (ISP) network (e.g., ISP network 113) through an asynchronous transfer mode (ATM) based broadband access network (e.g., broadband access network 101) with a broadband access device (e.g., DSL modem 104) connected to the local loop (e.g., link 106a). An IP client (not shown) on the IP enabled device secures an IP address from the ISP using Dynamic Host Configuration Protocol (DHCP) from a DHCP server (not shown) in communication with the ISP's router. The DHCP server temporarily allocates or leases a unique IP address to the IP client. The IP client may now obtain IP based services available on the ISP network and beyond by sending and receiving packets to and from the ISP's router through the broadband access network. Sources on the Internet 115 are reached by utilizing a communications link between the ISP network and the Internet 115 (e.g., communications link 117).

In addition to the layer 2 communications elements (e.g., asynchronous transfer mode (ATM) switches 108 and 109), layer 2/3 communications elements also form a part of broadband access network 101. Specifically, a plurality of layer 2/3 communications elements (e.g., ingress broadband gateways 120a–n) reside after various layer 2 communications elements (e.g., ATM Switch 108) lying near ingress points for access device IP traffic (e.g., IP traffic from personal computer 103), and a plurality of layer 2/3 communications elements (e.g., egress broadband gateway 121a) reside after layer 2 communications elements (e.g., ATM Switch 109) lying near egress points for access device IP traffic destined for ISP networks (e.g., ISP network 113) linked to broadband access network 101.

Each of the layer 2/3 communications elements in broadband access network 101 supports the creation of layer 3 communications sessions between various communications elements within and without network 101 using layer 3 protocols such as IP. The layer 2/3 communications elements also support the creation of virtual layer 2 communications sessions or "virtual PVCs (vPVCs)" using one or more of the following protocols: Point-to-Point Protocol (PPP) over Ethernet (PPPoE), PPP over ATM (PPPoA), Layer 2 Tunneling Protocol (L2TP), Point-to-Point Tunneling Protocol (PPTP), and/or Switched Multimegabit Data Service (SMDS) Interface Protocol (SIP). A PVC is a "permanent" virtual circuit and provides an "always on" connection whether the subscribers is actively using it or not. Thus, a series of three layer 2 virtual PVCs (e.g., vPVC1a 125a, vPVC2a 126a, and vPVC3a 127a) extend from an access device (e.g., ADSL modem 104) to an ISP (e.g., ISP network 113) through broadband access network 101 (versus having a single layer 2 PVC extending from an access device to an ISP as in other broadband access networks).

The first layer 2 vPVC (e.g., vPVC1a 125a) extends from an access device (e.g., ADSL modem 103) to one of the ingress layer 2/3 communications elements (e.g., ingress broadband gateway 120a), and is the only vPVC devoted exclusively to a single IP subscriber. Typically the first layer 2 vPVC is a user authenticated PPP session. In one embodiment of the network 101 the first layer 2 vPVC is a user authenticated PPPoE session where the IP enabled device (or the operator thereof) supplies a username and domain (e.g., "user1@domain1"). Based on the domain provided, the first layer 2/3 communications element establishes a virtual layer 2 connection using L2TP over the remaining two layer 2 vPVCs to reach the appropriate ISP and the ISP provides the IP enabled device an IP address for obtaining IP based services. This model allows for the creation of access sessions with different ISPs depending on the domain provided by the 1P enabled device. This model also allows IP services to be billed to a particular user on a per access session basis.

The second vPVC (e.g., vPVC2a 126a) extends from the foregoing ingress layer 2/3 communications element (e.g., Ingress Broadband Gateway 120a) to one of the egress layer 2/3 communications elements (e.g., Egress Broadband Gateway 121a). Through the use of a tunneling protocol such as L2TP, PPP aggregation occurs at the layer 2/3 ingress communications element and the multiple PPP communications sessions between access devices (e.g., access devices in homes 102b–n) served by the ingress layer 2/3 communications element are funneled into the second vPVC. The third vPVC (e.g., vPVC3a 127a) extends from the foregoing egress layer 2/3 communications element (e.g., Egress Broadband Gateway 121a) to the layer 2/3 communications element in the ISP network. In this embodiment of the invention the layer 2/3 communications element in the ISP network is an LNS capable router (e.g., layer 2/3 communications element 114). Again, through the use of a tunneling protocol such as L2TP, PPP aggregation occurs at the egress layer 2/3 communications element and the multiple PPP communications sessions from multiple L2TP IBG tunnels are concentrated onto a single L2TP tunnel by the egress broadband gateway and are funneled into the third virtual PVC. The third virtual PVC delivers a large (doubly aggregated) L2TP tunnel to the LNS router 114 where the PPP sessions are terminated and IP packets are once again routed normally.

In one embodiment of network 101 ATM switch 108 comprises a Lucent CBX 500 multiservice WAN switch, ATM switch 109 comprises a Lucent GX 550 multiservice WAN switch, ingress and egress broadband gateways 120, 121 comprise Nortel 5000 Broadband Service Nodes, and DSLAM 107 comprises an Alcatel 7300 DSL Access Line Multiplexer.

As discussed, each twisted wire pair from a customer premises (e.g., homes 102a–n) housing an xDSL modem (e.g., ADSL modem 104) connects to a DSLAM (e.g., DSLAM 107), at which point the analog voice and digital data signals are split out along separate paths. The analog voice signals are forwarded to a POTS voice switch housed in the CO. The digital signals on the other hand are multiplexed, typically utilizing time division multiplexing (TDM), into a single digital stream that is subsequently placed into the ATM infrastructure of network 101. This multiplexing of xDSL signals into a single digital stream of data is accomplished through a plurality of cross-connects in the switching fabric of the DSLAM, at least one for each customer premises receiving xDSL service. Accordingly, it is quite important for network management and planning to know exactly how many cross-connects have been provisioned in each DSLAM. DSLAMs have a finite number of cross-connects that may be provisioned in their switching fabric and therefore have a direct impact on the number of customer premises that may be served in a particular region without installing additional network infrastructure.

Presently, the only method of inventorying the switching fabric in a particular DSLAM, and in the network as a whole, is for a technician to physically visit and log into each DSLAM. In a network having a small number of subscribers (and therefore a small number of DSLAMs) such an undertaking while inconvenient is nevertheless possible. However, as the size of the network grows to include large numbers of subscribers maintaining an accurate inventory of the number of cross-connects in a particular DSLAM and the network as a whole at any given point in time by physically visiting each DSLAM becomes wildly inconvenient and nearly impossible. Hence, there is a need for a system and method of inventorying the switching fabric in a DSLAM and a broadband access network as a whole that does not require physically visiting each DSLAM in that network.

II. SUMMARY OF THE INVENTION

A method for inventorying a broadband access network multiplexing element switch fabric, the multiplexing element being a managed element in a broadband access network management system coordinated by a network manager, comprising establishing communication with an element manager from a remote location, the element manager comprising an intermediary between the network manager and the multiplexing element, gathering status information for the multiplexing element by issuing a first interface retrieve command to the element manager from the remote location, and gathering status information for the fabric structure by issuing a second interface retrieve command to the multiplexing element from the remote location.

A system for inventorying a broadband access network multiplexing element switching fabric, comprising an element manager, the element manager comprising an intermediary between a network manager and the multiplexing element, a first communications path between the element manager and the multiplexing element, the first communications path carrying information and control commands between the element manager and the multiplexing element, an inventory tool at a location remote from the element manager, the inventory tool generating inventory commands and compiling status information received in response to the inventory commands, and a second communications path between the inventory tool and the element manager, the second communications path carrying the inventory commands and status information between the inventory tool and the element manager.

III. BRIEF DESCRIPTION OF THE DRAWINGS

These and other features, aspects, and advantages of the invention will become better understood in connection with the appended claims and the following description and drawings of various embodiments of the invention where similar reference numerals refer to similar elements in all the figures of the drawings and:

Also included is the following appendix:

Appendix I lists pseudo-code for implementing one embodiment of the invention described and claimed herein.

IV. DETAILED DESCRIPTION OF THE PREFERRED EMBODIMENTS

Figure 1:
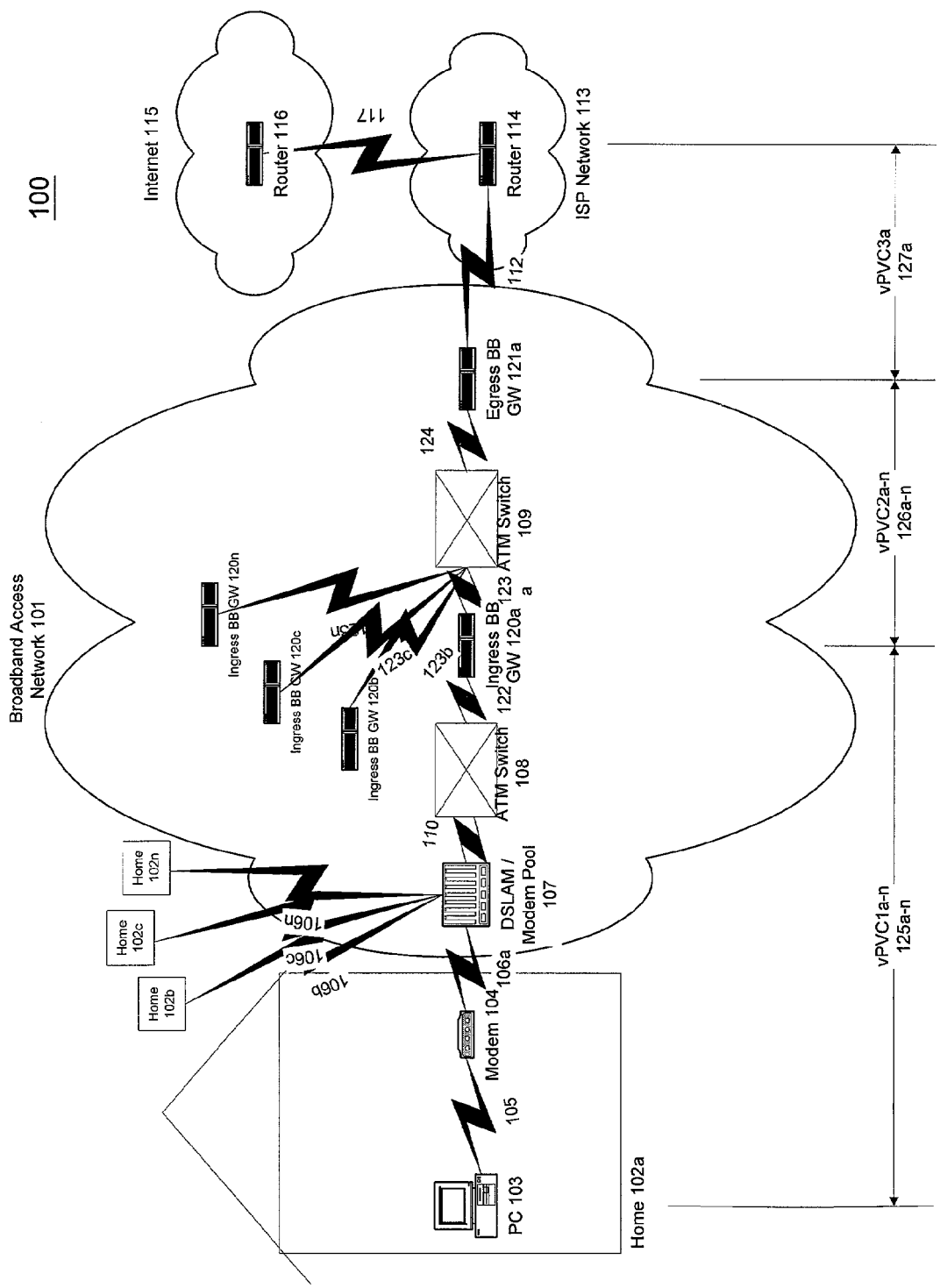
FIG. 1 shows in block diagram form a digital subscriber line broadband access architecture currently employed by the assignee of the present invention.
Figure 2:
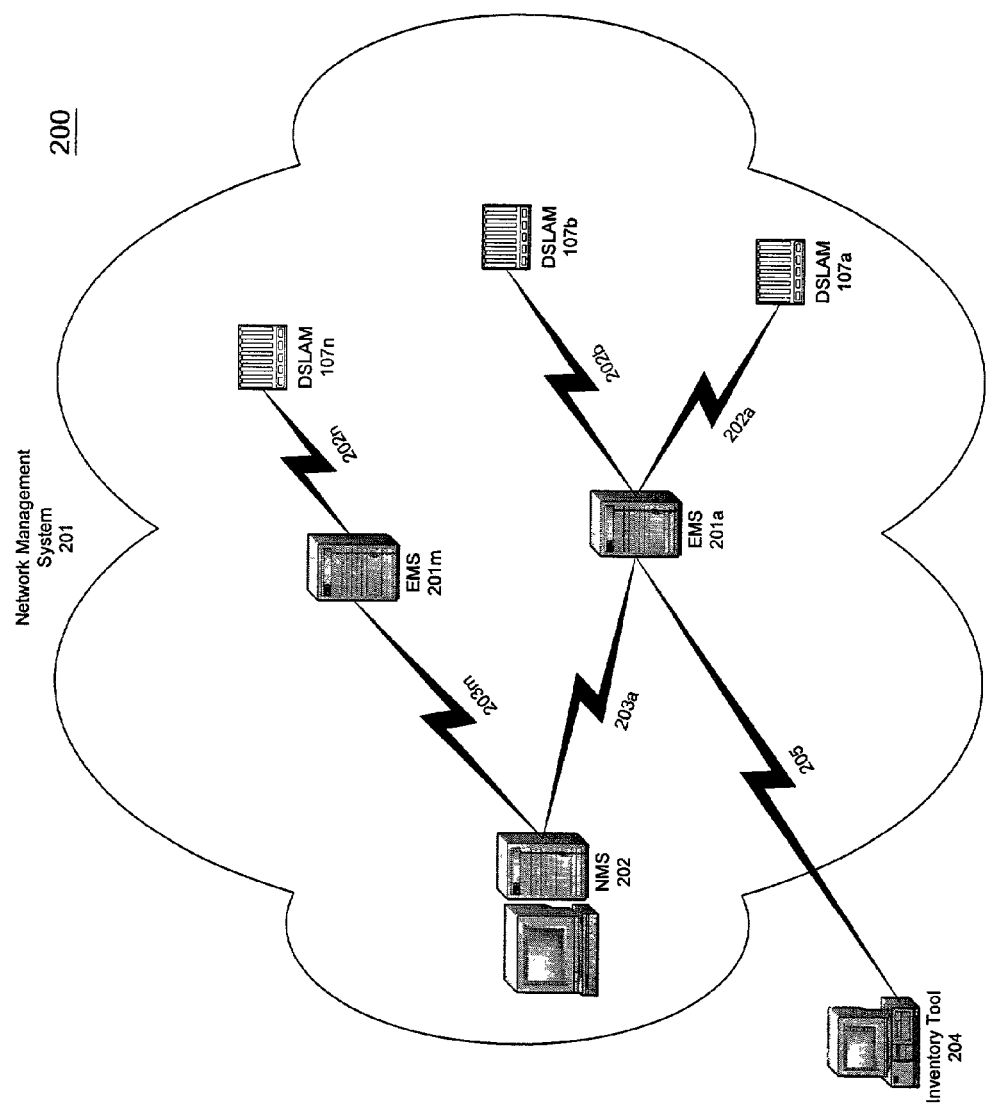
FIG. 2 shows in block diagram form a system for inventorying a broadband access network multiplexing element switch fabric according to one embodiment of the invention.

FIG. 2 shows a system 200 for inventorying a broadband access network multiplexing element switch fabric according to one embodiment of the invention. System 200 is comprised of a broadband access network management system 201 communicably linked 205 to an inventory tool 204. In the embodiment of the invention depicted inventory tool 204 comprises a personal computer running executable software. It will be appreciated however that the inventory tool could be implemented in any number of ways, including but not limited to electronic device with appropriate firmware loaded therein. The software and/or firmware, typically in response to operator commands, generates network interface commands that are sent to various components within network management system 201 via communications link 205 and compiles information from various components within network management system 201 that it receives in response to the interface commands via communications link 205.

The interface commands may comprise any number of commands, including but not limited to, retrieve commands. The form of network interface may comprise any number of interfaces, including but not limited to, protocol-independent interfaces such as transport layer interface (TLI). The information received in response to the interface commands may comprise any type of information about the components within network management system 201, including but not limited to, status information about the components such as the number of elements managed by a component, the network addresses (e.g., IP address, uniform resource locator (url), cilli code, MAC address) of the elements managed by the component, the number, type, remaining capacity, and the like, of cross-connects in the switch fabric of a multiplexing element, and the like. In a preferred embodiment of the invention inventory tool 204 includes a TCP/IP stack, communications path 205 comprises a TCP/IP link, and the communications session between inventory tool 204 and a component within network management system 201 is via an unassigned port such as port 14000. Where communications path 205 comprises a TCP/IP link, the TCP/IP link may beneficially comprise terminal emulation protocol link such as a telnet link. Optionally, inventory tool may include the facility to create reports based on the information received in response to the interface commands, to present the information to an operator on a visual display or in a printed report, and to save the information compiled and/or reports generated in a memory as a flat file or other electronic format.

Network management system 201 comprises at least one network manager (NM) 202, a plurality of element managers (EMs) 201a–201m, the DSLAMs 107a–n forming a portion of broadband access network 101, and a plurality of communication paths or links 202a–n, 203a–m between the NM, EMs, and DSLAMs. NM 202 coordinates the operation of all nodes, elements, objects, cards, physical links, equipment, and the like, within network management system 201. The DSLAMs 107a–n comprise managed elements within network management system 201, while EMs 201a–m comprise intermediaries between NM 202 and DSLAMs 107a–n. As an intermediary the EMs interpret messages, such as simple network management protocol (SNMP) messages, to and from nodes in network management system 201. In one embodiment of the invention communication between the NM 202 and the EMs 201a–m is via X.25, serial, TCP/IP, or UDP/IP connection while communication between the EMs 201a–m and the DSLAMs 107a–n is via SNMP over UDP/IP. In a preferred embodiment of the invention NM 202 comprises an Alcatel 5620 Network Manager, EMs 201a–m comprise Alcatel 5526 Access Management Systems, and DSLAMs 107a–n comprise Alcatel 7300 DSL Subscriber Access Platform.

Figure 3:
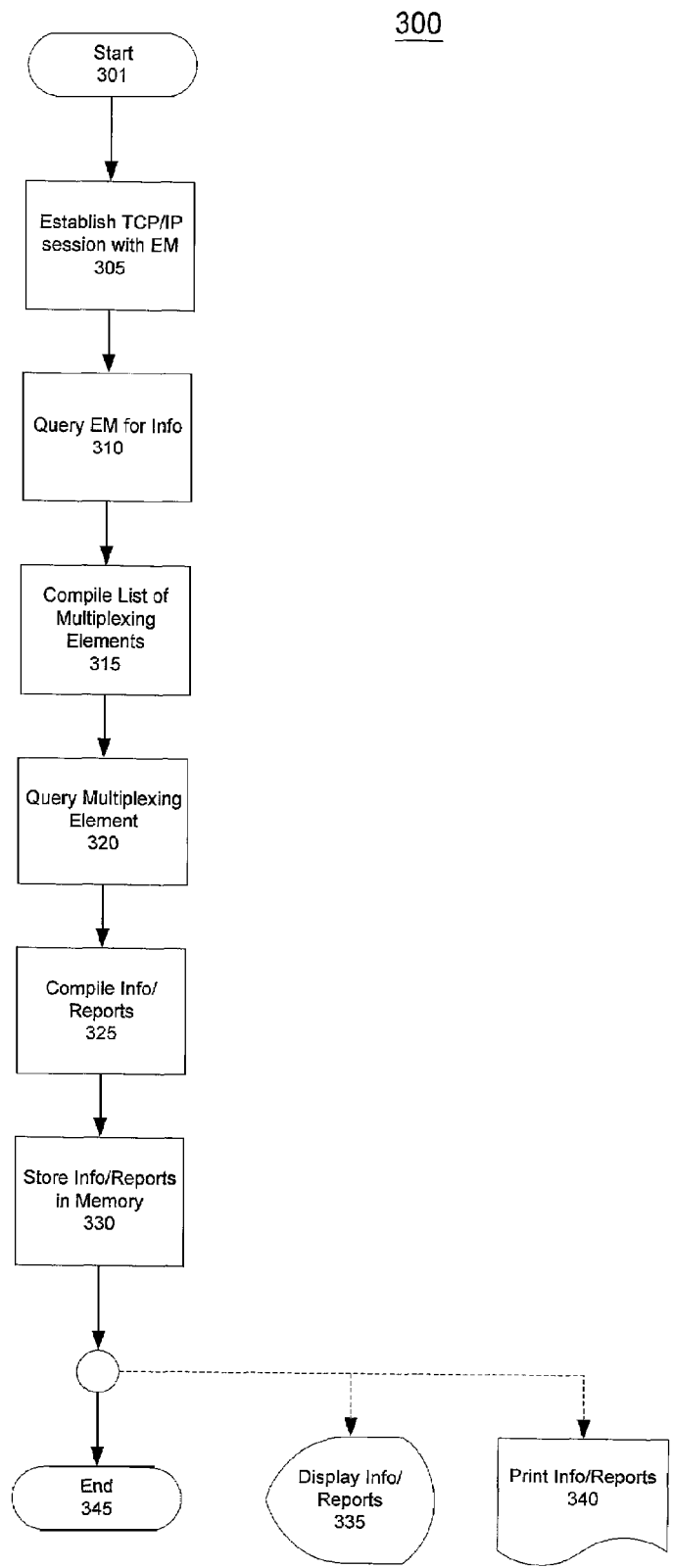
FIG. 3 shows a flow diagram for inventorying a broadband access network multiplexing element switch fabric according to one embodiment of the invention.

FIG. 3 shows a flow diagram 300 for inventorying a broadband access network multiplexing element switch fabric according to one embodiment of the invention. The process starts in step 301. In step 305 of the process the inventory tool establishes a TCP/IP communications session utilizing unassigned port 14000 with an element manager (e.g., EM 201*a*) in a broadband access network management system. The inventory tool is located remotely from the element manager. In step 310 the inventory tool queries the element manager for status information on all the multiplexing elements (e.g., DSLAMs 107*a*–*b*) it manages by issuing a TLI retrieve command. In step 315 the inventory tool receives and compiles the status information sent to it by the element manager over the TCP/IP link. In this embodiment of the invention the status information includes among other things cilli codes for all of the multiplexing elements managed by the particular element manager.

In step 320 the inventory tool, utilizing the status information received in step 315, queries an individual multiplexing element (e.g., DSLAM 107*a*) for status information about the multiplexing element by issuing a TLI retrieve command to the multiplexing element via the element manager. In one embodiment of the invention, step 320 is accomplished by the inventory tool issuing a TLI retrieve command to the element manager with the multiplexing element identified by cilli code. In step 325 the inventory tool receives the status information from the multiplexing element and compiles that information into a list and/or report. At a minimum the status information includes the number of cross-connects provisioned in the switch fabric of the multiplexing element. The status information may also include the type of cross-connects provisioned as well. In step 330 the inventory tool saves the status information and/or reports in a memory. In one embodiment of the invention the status information is stored as a flat file in the memory. Steps 335 and 340 are optional. In step 335 the inventory tool displays the status information compiled from the multiplexing element and/or any report based thereon on a display, while in step 340 the inventory prints a copy of the status information and/or any reports. In step 345 the process ends.

In another embodiment of the invention steps 320 through 330 are repeated for each multiplexing element managed by the element manager contacted in step 305. In still another embodiment of the invention steps 305 through 330 are repeated for each element manager in the broadband access network management system.

While the invention has been described in connection with the embodiments depicted in the various figures, it is to be understood that other embodiments may be used or modifications and additions may be made to the described embodiments without deviating from the spirit of the invention. Therefore, the invention should not be limited to any single embodiment whether depicted in the figures or not, but rather construed in breadth and scope in accordance with the claims appended below.

We claim:

1. A method for inventorying a switch fabric in a broadband access network multiplexing element, the multiplexing element comprising a managed element in a broadband access network management system coordinated by a network manager, the method comprising:

inventorying a switch fabric in a broadband access network multiplexing element in a broadband access network from a remote location;

forming a portion of the broadband access network with a digital subscriber line access multiplexer (DSLAM);

establishing communication with an element manager in the plurality of element managers from the remote location, the element manager comprising an intermediary between the network manager and the multiplexing element;

gathering status information for the multiplexing element in a plurality of multiplexing elements by issuing a first interface retrieve command to the element manager from the remote location, wherein gathering the status information comprises determining a number of logical cross-connects provisioned in the multiplexing elements;

gathering status information for the switch fabric by issuing a second interface retrieve command to the multiplexing element from the remote location by utilizing the status information from the element manager;

repeating the gathering status information for the switch fabric for each remaining multiplexing element in the plurality of multiplexing elements;

repeating the gathering status information for the element manager for each remaining element manager in the plurality of element managers;

receiving and compiling the status information into a report; and maintaining an inventory of the number of cross-connects in the DSLAM and in the broadband access network from the remote location.

2. The method of claim 1 wherein the establishing communication with the element manager from the remote location comprises establishing a TCP/IP session with the element manager.

3. The method of claim 2 wherein the establishing the TCP/IP session with the element manager comprises establishing a terminal emulation protocol session with the element manager.

4. The method of claim 3 wherein the establishing the terminal emulation protocol session with the element manager comprises establishing a telnet session with the element manager.

5. The method of claim 2 wherein the establishing the TCP/IP session with the element manager comprises establishing a TCP/IP session via an unassigned port.

6. The method of claim 1 wherein the gathering status information for the multiplexing element comprises gathering a network address for the multiplexing element.

7. The method of claim 6 wherein the gathering the network address for the multiplexing element comprises gathering a cilli code for the multiplexing element.

8. The method of claim 1 wherein the issuing the first and second interface retrieve commands comprise issuing protocol-independent interface retrieve commands.

9. The method of claim 8 wherein the issuing the protocol-independent interface retrieve commands comprise issuing transport level interface retrieve commands.

10. The method of claim 1 wherein the further comprising storing the status information in a flat file in a memory.

11. The method of claim 1, wherein the gathering the status information for the switch fabric comprises gathering a logical cross-connect type for each of the logical cross-connects in the multiplexing element.

12. The method of claim 1 further comprising storing the status information in a memory.

13. The method of claim 1 further comprising displaying and printing the report based on the status information.

14. A system for inventorying a broadband access network multiplexing element switch fabric, comprising:

a broadband access network comprising a multiplexing element switch fabric;

a digital subscriber line access multiplexer (DSLAM) forming a portion of the broadband access network;

an element manager, the element manager comprising an intermediary between a network manager and the multiplexing element;

a first communications path between the element manager and the multiplexing element, the first communications path carrying information and control commands between the element manager and the multiplexing element;

an inventory tool at a location remote from the element manager, the inventory tool generating switch fabric inventory commands and compiling switch fabric inventory information received in response to the switch fabric inventory commands;

wherein the switch fabric inventory information comprise a number of logical cross-connects provisioned in the switch fabric;

a second communications path between the inventory tool and the element manager, the second communications path carrying the switch fabric inventory commands and switch fabric inventory information between the inventory tool and the element manager; and a memory saves and maintains the fabric switch inventory information.

15. The system of claim 14 wherein the inventory tool comprises a software client running on a computer.

16. The system of claim 15 wherein the software client includes a TCP/IP stack and the first communications path comprises a TCP/IP link.

17. The system of claim 16 wherein the TCP/IP link compromises a terminal emulation protocol link.

18. The system of claim 17 wherein the terminal emulation protocol link comprises a telnet link.

19. The system of claim 16 wherein the TCP/IP link comprises a TCP/IP link utilizing an unassigned port.

20. The system of claim 14 wherein the inventory commands generated by the inventory tool comprise interface retrieve commands.

21. The system of claim 20 wherein the interface retrieve commands generated by the inventory tool comprise protocol-independent interface retrieve commands.

22. The system of claim 20 wherein the interface retrieve commands generated by the inventory tool comprise transport level interface retrieve commands.

23. The system of claim 14 wherein the switch fabric inventory information is stored in a flat file in the memory.

24. The system of claim 14 wherein the switch fabric inventory information returned in response to the inventory commands further comprises a logical cross-connect type.

25. A system for inventorying a broadband access network multiplexing element switch fabric, comprising:

means for inventorying a broadband access network multiplexing element switch fabric from a remote location;

means for forming a portion of a broadband access network with a digital subscriber line access multiplexer (DSLAM);

means for establishing communication with an element manager from the remote location, the element manager comprising an intermediary between a network manager and the multiplexing element;

means for gathering status information for the multiplexing element by issuing a first interface retrieve command to the element manager from the remote location; wherein gathering the status information comprises determining a number of logical cross-connects provisioned in the multiplexing element switch fabric;

means for gathering switch fabric inventory information for the fabric structure of the multiplexing element by issuing a second interface retrieve command to the multiplexing element from the remote location, by utilizing the status information for the element manager;

means for receiving and compiling the status information from the element manager; and means for maintaining an inventory of the number of cross-connects in the DSLAM and in the broadband access network from the remote location.

* * * * *